United States Patent [19]

Krøyer

[11] 4,157,907
[45] Jun. 12, 1979

[54] METHOD OF PRODUCING A MOULDABLE MATERIAL HAVING A HIGH CONTENT OF A CRYSTALLIZABLE GLASS

[76] Inventor: Karl K. K. Krøyer, Engtoften 3, DK-8260 Viby J., Denmark

[21] Appl. No.: 759,226

[22] Filed: Jan. 13, 1977

[30] Foreign Application Priority Data

Jan. 20, 1976 [DK] Denmark .................................. 212/76

[51] Int. Cl.² ................................................ C03C 17/32
[52] U.S. Cl. .......................................... 65/33; 427/221; 65/60 B; 428/404; 264/123; 106/309
[58] Field of Search .............. 427/221, 220, 212, 215; 264/123, 109, 115, 117; 428/404; 106/309; 65/60 B

[56] References Cited

U.S. PATENT DOCUMENTS

| | | | |
|---|---|---|---|
| 2,965,514 | 12/1960 | Less | 427/221 |
| 3,317,332 | 5/1967 | Pliskin | 106/309 |
| 3,443,492 | 5/1969 | Pleass | 272/56.55 S |
| 3,925,096 | 12/1975 | Karkov | 427/221 |
| 3,953,657 | 4/1976 | Yamaguchi | 427/221 |
| 3,969,103 | 7/1976 | Capes | 264/117 |

*Primary Examiner*—Sam Silverberg
*Attorney, Agent, or Firm*—Ladas, Parry, Von Gehr, Goldsmith & Deschamps

[57] ABSTRACT

The present invention relates to a method of producing a mouldable material having a high content of a crystallizable glass made in a rotary kiln in a highly bubble-containing form, and grinding the glass in a ball mill.

12 Claims, No Drawings

METHOD OF PRODUCING A MOULDABLE MATERIAL HAVING A HIGH CONTENT OF A CRYSTALLIZABLE GLASS

The invention is based on using particles of crystallizable glass obtained by fusing sand, chalk and dolomite in a rotary kiln and possible subsequent crystallization of the formed crystallizable glass by heating in a rotary kiln and grinding the crystallizable or crystallized glass in a ball mill to a desired particle size. British Pat. No. 992,782 describes a method of making such a glass. The product is also known as "synopal particles". Such particles contain a substantial number of micro-bubbles deriving from the formation of carbon dioxide during the melting process, and in the process described these micro-bubbles remain in the material. In the ball-mill grinding operation the glass is milled into irregularly formed particles having a highly advantageous distribution curve or fineness characteristic, i.e. the milled product contains a sufficient amount of fine particles to substantially fill the space between the coarser particles. The milling produces numerous hollow space or cavities in the particle surfaces as a result of the presence of the said micro-bubbles.

Synopal particles have been used as an aggregate for road surfaces and as fillers in a variety of products such as coating materials and moulding compositions. Hence, it is known to mix synopal particles with a binder or an organic resin and to use such mixtures as moulding compositions for producing various articles or semi-products.

Since synopal particles, because the low-cost raw materials and relatively simple manufacturing process lending itself to mass production, are substantially cheaper than most binders, it is profitable to use as little binder as possible. Since the synopal particles, as stated above, have a very advantageous finess characteristic, it is possible to obtain mouldable mixtures having a relatively high particle content in relation to binder. Hence, it is known in conventional manner, i.e. by simple mixture, to obtain suitable mouldable compositions containing, for example, up to 50% by weight of synopal particles.

It is an object of the present invention to produce moulding compositions having a high content of crystallizable glass particles without impairing their mouldable properties and mechanical characteristics.

It is another object of the invention to produce moulding compositions which by virtue of a high content of crystallizable glass particles and the lowest possible content of binder are extremely cheap.

It is yet another object of the invention to produce moulding compositions having a high content of the said particles and possessing relatively good mouldable properties and mechanical characteristics such as compressive strength and tensile strength.

The invention is based on the recognition that the distribution of binder is substantially improved if this is introduced during the grinding process itself in the ball mill. In the method according to the invention, which is characterised by the features defined in the characterising clause of claim 1, it is thus achieved by performing at least part of the ball-mill grinding operation in the presence of the binder or part thereof that the binder is uniformly distributed on the surface of the particles. This makes it possible to produce a mouldable material which by compression or other conventional shaping may be converted to a strong and coherent product possessing optimum mechanical characteristics. Even in the presence of a relatively small amount of binder, the latter when subject to compression will readily flow between the particles and provide an effective and strong bond between the particles. The uniform distribution of binder on the particle surfaces obtained in the ball-mill grinding operation likewise contributes to improved mouldability of the material despite a low content of binder. The bonding between particles and binder is further enhanced on account of the hollow spaces or cavities present in the surface and deriving from the said micro-bubbles.

According to the invention, it has proved advantageous to introduce the binder at a point during the ball-mill grinding operation when division of the crystalline glass into fine particles has essentially taken place. This will allow the particles, having substantially obtained the desired particle size, to relatively quickly mix with and be coated on the surface with the organic resin.

According to an advantageous embodiment of the method according to the invention, there is used a ball mill formed as a cylindrical continuous rotary kiln in which the crystallized glass is introduced to one end of the kiln and the ground material discharged from the other end, the binder being introduced to an intermediate zone of the cylinder, preferably proximate to the discharge end.

A ball mill formed in this manner has a large capacity and saves labour and is therefore suitable for producing large quantities of material per unit of time. During the grinding operation there is generated heat, with the effect that the temperature of the material may rise to, for instance 50° to 60° C., which promotes even and uniform coating of the particles with binder. The degree of grinding depends on the application of the material. For most purposes a particle size of from 0 to 150 microns has proved advantageous. The grinding operation, however, may also be stopped at a larger particle size, for example at a size of from 0 to 250 microns and above. For certain purposes, such as the manufacture of large-size articles like tiles, it is possible to use particles having a maximum size of 1 mm or more, for example up to 5 mm or more. It is also possible to use very finely divided material having a particle size of from 0 to 50 microns, for example. Furthermore, for special purposes may be used particles screened to obtain certain fractions. For example, particles having a size between 50 and 150 microns or between 100 and 200 microns have proved suitable for manufacturing porous articles such as water-permeable tiles or filters, in which case there is used so little binder that it is unable to completely fill the space between the particles.

For the production of the subject moulding composition there is preferably selected a proportion of particles to binder whereby the amount of crystallized glass constitutes from 50 to 95%, based on the weight of finished composition. Such proportions are suitable for manufacturing articles to be shaped by compression, extrusion or injection moulding. The preferred content of crystallized glass is from 70 to 90% by weight, based on mouldable material. For special purposes the content of crystallized glass may be higher, according to the invention 95% or more, based on the weight of moulding composition. This therefore applies where it is desired to manufacture porous articles such as filter boards.

The preferred binder is thermosetting binders as these impart high strength and resistance to heat to the finished product after setting. If desired, however, it is also possible to use thermoplastic binders which result in products that are easy to shape by injection moulding or extrusion. Examples of suitable thermosetting binders are epoxy resins, melamine resins and urea formaldehyde resins. Other curable plastics that may be used are polyurethane resins, phenol-formaldehyde resins and unsaturated polyesters.

Among suitable thermoplastic resins for the subject moulding composition in the method according to the invention should be mentioned polyethylene, polypropylene, polyvinyl acetate, polyacrylates, polystyrene, polyamides and polycarbonates.

The binder may be introduced to the ball mill as a dry powder. As a result of grinding it will be uniformly distributed on the surface of the particles. The distribution may be further facilitated by adding a solvent, or the binder may be introduced as a solution of the organic resin in a suitable solvent. The type of solvent depends on the nature of the binder used. Hence, water may be used in combination with melamine resins and urea formaldehyde resins. Besides, it is possible to use conventional solvents such as acetone, benzene, alcohols or esters. Also hydrocarbons such as turpentine or petroleum are suitable. The solvent may also, if desired, be added before introducing the binder. Such solvents as a rule evaporate on account of the frictional heat generated during the grinding operation.

If desired, it is possible to add also minor amounts or various adjuvants to achieve desired effects or as additional fillers. Hence, may be added silicon oxides or hydroxides, such as Aerosil, which in amounts of from 0.01 to 1% will result in increased fluidity, improved density and uniformity of the finished product.

Other additives suitable in small or moderate amounts are small glass spheres, short mineral fibres, for example of glass or rockwool, and pigments. Pigmentation will achieve various decorative effects. By mixing fractions of different colours it is also possible to obtain various marbled patterns.

If a two-component binder is used, the components may, if desired, be ground separately with synopal particles, and the two products may be mixed immediately before moulding or shaping.

Improved mouldability during shaping may also be achieved by mixing materials produced by means of various types of binders, for example thermoplastic and thermosetting binders. This will in certain cases result in improved impact strength and elasticity. It is also possible to mix products with differently colored or pigmented binders to obtain various decorative effects such as striped or marbled boards. The mouldable material produced according to the invention makes it possible to manufacture products having good mechanical characteristics such as great strength. The material further possesses good electrical properties such as high dielectric constant and good leakage current characteristics. The material is therefore suitable for manufacturing electrical articles such as switches.

Among applications of the subject material should also be mentioned building materials, such as boards, partitions and roofing tiles, household articles such as cutlery, plates, cups and goblets, packaging, filters, porous tiles, materials for filling teeth and industrial articles.

The invention will be further explained below by means of a number of examples.

EXAMPLE 1

Used was a ball mill having a volume of 10 m$^3$, lined with aluminium-oxide bricks and partly filled with flint nodules. The ball mill was charged with 4 tons of synopal glass having a grain size of from 0 to 2 mm, crystallized by heating in a rotary kiln and thereafter cooled. The ball mill was run for about 3 hours, resulting in the particle size being reduced to from 0 to 200 microns. This was followed by adding 800 kg of Uredana, which is an urea formaldehyde resin. After additional 3 hours of running there was obtained a material having a particle size of from 0 to 150 microns, which material was excellent for compression in conventional heated moulds for manufacturing cups and similar articles.

EXAMPLE 2

The ball mill described in Example 1 was charged with 4 tons of synopal glass and ground to a grain size of from 0 to 300 microns. This was followed by adding 200 kg of melamine resin, and milling was continued for 3 hours. The ground product was subjected to fractional screening, and there was collected particles having a grain size of from 100 to 200 microns. This material was compressed in a mould heated to 200° C. to obtain a filter board.

EXAMPLE 3

The procedure according to Example 2 was repeated, using a setting epoxy resin in lieu of melamine. The finished filter board possessed the same filtering characteristics as that obtained in Example 1, but exhibited particular chemical resistance to chemicals.

EXAMPLE 4

A conventional rotary kiln having a length of 10 m and a contents of 6 tons of grinding material was charged on an hourly basis with 2 tons of synopal having a particle size of from 0 to 10 mm. The material was continuously introduced to one end of the kiln, and after setting to a stationary position 2 tons of ground product were removed from the other end of the kiln. Through a pipe inserted into the inlet of the kiln to terminate 2 m from the inlet were introduced 2 kg of Aerosil per hour. Through a pipe inserted into the discharge to terminate 3 m from same were introduced 400 kg of melamine resin per hour, and through a pipe inserted 2 m into the discharge were introduced 2 kg of Aerosil per hour. Frictional heat was generated during the grinding process, causing the temperature to rise to 50° to 60° C. The discharged material coated with resin has a grain size of from 0 to 150 microns. The product displayed excellent fluidity, and by compression in moulds having a temperature of 180° C. there were obtained articles of particularly high density and uniformity.

EXAMPLE 5

In the rotary kiln described in Example 4 were ground from 0 to 10 mm synopal particles into a size of from 0 to 5 mm, using melamine resin in an amount of 5% of the mixture.

By screening the product there was isolated a fraction having a grain size of from 2.5 to 5 mm. This material was homogenized by means of a vibrator of the type generally employed in the cement industry, and there was obtained a tile of 50×50×3 cm by compression in a mould at 180° C. The tile was porous to allow rainwater to pass quickly therethrough. A similar tile was impregnated with a 5% melamine solution, and after drying the tile was heated for curing in a kiln at 160° C. The tile so treated was still porous but has high tensile and compressive strength.

Of the residual product, after isolating the coarse particles was removed a batch which was mixed with 10% melamine powder containing orange pigments. It was a dry mixture effected by drum in a conventional manner. From the resultant product was obtained a board of 25×25×6 cm which was dense and strong and of beautiful orange appearance.

EXAMPLE 6

In the ball mill described in Example 1 were ground 400 kg of synopal and 175 kg of powdery curable epoxy resin for 3 hours. From the resultant material, having a particle size of from 0 to 140 microns, were obtained cups and other household articles by compression in a mould at 190° C. and a pressure of 150 kp/cm$^2$.

EXAMPLE 7

In the ball mill described in Example 1 were ground 400 kg of synopal and 200 kg of a 75% aqueous melamine resin solution. During running for 3 hours the product was heated by frictional heat to 60° C. to thereby evaporate the water. The ground product had a grain size of from 0 to 140 microns.

EXAMPLE 8

In a ball mill were ground 80 parts by weight of synopal and 40 parts by weight of a 50% aqueous dispersion of polyvinyl acetate. After grinding to a particle size of from 0 to 140 microns there were added additional 20 parts by weight of dry polyvinyl acetate powder which was admixed by drum mixing. The finished material could readily be shaped by extrusion as it was free-flowing after heating to temperatures above 100° C.

EXAMPLE 9

In a ball mill were ground 60 parts by weight of synopal and 40 parts by weight of polystyrene powder. The material ground to from 0 to 140 microns was mixed with corresponding synopal particles coated with epoxy resin according to the procedure of Example 6. Articles made therefrom exhibited high tensile strength.

What I claim is:

1. Method of producing a mouldable material in the form of coated glass particles, comprising the steps of
   (a) producing a glass melt in a rotary kiln,
   (b) removing said glass melt from the kiln to form a crystallizable glass,
   (c) grinding the glass in a ball mill to a desired particle size, and
   (d) adding a thermosetting organic resin binder to the glass during the grinding procedure to form a coating on said glass particles wherein the amount of crystallizable glass constituted from 50% or more by weight, based on the total weight of glass and binder.

2. A method according to claim 1, characterized in that the binder is introduced at a point during the ball mill grinding process when division of the crystallizable glass into fine particles has essentially taken place.

3. A method according to claim 1, characterized in that the ball mill is formed as a cylindrical continuous rotary kiln in which the crystallizable glass is introduced to one end of the kiln and the ground material discharged from the other end thereof, the binder being introduced to an intermediate zone of the kiln, preferably proximately to the discharge end.

4. A method according to claim 1, characterized in that the grinding is continued until the material has obtained a particle size of maximum 150 microns.

5. A method according to claim 1, characterized in that the amount of crystallizable glass constitutes from 50 to 95%.

6. A method according to claim 1, characterized in that the amount of crystallizable glass constitutes from 70 to 90%.

7. A method according to claim 1, characterized in that the amount of crystallizable glass constitutes 95% or more.

8. A method according to claim 1, characterized in that the binder is an epoxy resin.

9. A method according to claim 1, characterized in that the binder is a melamine or urea resin.

10. A method according to claim 1, characterized by further adding an inorganic filler such as silicon oxides.

11. A method according to claim 7, characterized by adding further amounts of binder after the ball mill grinding process.

12. The method defined in claim 1 wherein the crystallizable glass formed during step (b) is subjected to a subsequent crystallization by heating in a rotary kiln.